United States Patent [19]

Lacona

[11] E Re. 30,481

[45] Reissued Jan. 13, 1981

[54] PROCESS FOR REDUCING THE PROCESSING TIME IN THE PRODUCTION OF POLYESTERS

[75] Inventor: Joseph Lacona, Pittsburgh, Pa.

[73] Assignee: Koppers Company, Inc., Pittsburgh, Pa.

[21] Appl. No.: 73,628

[22] Filed: Sep. 10, 1979

Related U.S. Patent Documents

Reissue of:

[64] Patent No.: 4,046,739
Issued: Sep. 6, 1977
Appl. No.: 616,770
Filed: Sep. 25, 1975

[51] Int. Cl.[3] ..... C08G 63/16

[52] U.S. Cl. ..... 528/302; 528/272; 528/303; 528/304

[58] Field of Search ..... 528/302, 303, 304, 272

[56] References Cited

U.S. PATENT DOCUMENTS

| | | | |
|---|---|---|---|
| 2,904,533 | 9/1959 | Carlston et al. | 528/304 |
| 3,196,131 | 7/1965 | Mayer et al. | 528/301 |
| 3,252,941 | 5/1966 | Mayer et al. | 528/301 |
| 3,345,339 | 10/1967 | Parker et al. | 528/283 |
| 4,046,739 | 9/1977 | Lacona | 528/272 |

*Primary Examiner*—Lucille M. Phynes
*Attorney, Agent, or Firm*—Donald M. MacKay; Oscar B. Brumback; Herbert J. Zeh, Jr.

[57] ABSTRACT

Polyesters obtained by reacting isophthalic acid or terephthalic acid with a polyol with or without a catalyst in a first stage to form a half-ester mixture which is reacted in a second stage with an aliphatic polycarboxylic acid are produced at reduced processing times. In the first stage a portion of the total polyol to be reacted is contacted with substantially all of the isophthalic acid or terephthalic acid. Then, this mixture is heated with agitation to a temperature of at least 190° C. and the remaining portion of the polyol is added to the heated mixture with agitation in such a manner that the temperature remains at or above the 190° C. This temperature is maintained until the reaction to form a half-ester mixture is completed. This reaction may be conducted in the presence of an esterification catalyst. The polyester-monomer mixture is reacted in a second stage with an aliphatic polycarboxylic acid to produce the polyester.

9 Claims, No Drawings

PROCESS FOR REDUCING THE PROCESSING TIME IN THE PRODUCTION OF POLYESTERS

Matter enclosed in heavy brackets [ ] appears in the original patent but forms no part of this reissue specification; matter printed in italics indicates the additions made by reissue.

BACKGROUND OF THE INVENTION

This invention relates to a process for the production of polyesters from isophthalic acid or terephthalic acid. In particular, this invention relates to a process for the production of unsaturated polyesters from isophthalic acid or terephthalic acid, a polyol and an unsaturated aliphatic polycarboxylic acid.

When isophthalic acid and terephthalic acid were substituted for phthalic anhydride in the production of polyesters, the one-stage process used with phthalic anhydride was not as effective. The art developed a two-stage process in which polyesters were produced from isophthalic acid or terephthalic acid, a polyhydric alcohol, or polyol, and a saturated or unsaturated polycarboxylic acid.

One two-stage process is disclosed in U.S. Pat. No. 2,904,533 (Carlson et al). In the first stage the isophthalic acid is polycondensed with all of the glycol until essentially a zero acid number product mixture is obtained. Then, this product mixture has an unsaturated acid, such as maleic acid or anhydride, added to it until the desired acid number and unsaturated polyester is obtained. This two-stage process was subsequently improved by conducting the first stage reaction so most but not all of the water of esterification that theoretically could be produced was removed [for] *from* the first stage. Another improvement [on] *in* this two-stage process is the use of two dihydric alcohols of different carbon atom content. This process is disclosed in U.S. Pat. No. 3,196,131 (Mayer et al.). The higher boiling alcohol is charged to the first stage along with the aromatic dicarboxylic acid such as isophthalic acid. The unsaturated acid, the other dihydric alcohol and remaining first alcohol, if any, are charged to the second stage.

Another two-stage process is disclosed in U.S. Pat. No. 3,345,339 (Parker et al.). In the first stage a part of the polyol ingredient is reacted with isophthalic acid or terephthalic acid in the presence of an esterification catalyst, a tin compound, and in the substantial absence of an alpha, beta-ethylenically unsaturated polycarboxylic acid. In the second stage an alpha, beta-ethylenically unsaturated polycarboxylic acid is reacted with the reaction product mixture of the first stage.

All of these two-stage processes endeavor to increase the effectiveness of using isophthalic acid or terephthalic acid from that of a one-step process. In the two-stage process there is a serious disability over the one-stage process. The two-stage process takes from two to three times the number of hours to complete a polyester preparation as does the one-stage process. The above discussed patents purport to overcome this disadvantage in duration of processing time. The reduction in the duration of processing time effected by the two-stage process used in the prior art can be improved.

The object of this invention is to provide a process that reduces the processing time in the production of a polyester in a two-stage process from isophthalic acid or terephthalic acid, a polyol and a saturated or unsaturated aliphatic polycarboxylic acid.

SUMMARY OF THE INVENTION

The present invention is an improvement in the first stage polycondensation reaction of a two-stage process for the production of a polyester from isophthalic acid or terephthalic acid, a polyol, and a saturated or unsaturated aliphatic polycarboxylic acid. The isophthalic or terephthalic acid is reacted with at least a theoretical amount of polyol in the first stage to form a half-ester mixture of isophthalic or terephthalic acid and polyol. This mixture is reacted with the saturated or unsaturated aliphatic polycarboxylic acid in the second stage to form the polyester. The theoretical amount of polyol introduced in the first stage is approximately one equivalent of polyol for each equivalent of acid needed to produce the polyester.

The improvement embodying the present invention is to decrease the initial portion of polyol reacted with the isophthalic or terephthalic acid and heat this mixture to a temperature of at least 190° C., and then add the remaining portion of the polyol to this heated mixture at such a rate that the temperature does not drop below the 190° C.

The improvement in such a first stage esterification comprises: contacting a portion of the total amount of polyol with substantially all of the isophthalic or terephthalic acid wherein said portion is sufficient to make an agitatable mixture with the isophthalic or terephthalic acid, heating the agitatable mixture with agitation to a temperature of at least 190° C. where the reaction of isophthalic or terephthalic acid with polyol to form a half-ester mixture proceeds at a satisfactory rate, and adding the remaining portion of the total amount of polyol to the heated agitatable mixture in such a manner that the temperature of the heated agitatable mixture remains at or above 190° C. whereby a half-ester mixture is obtained.

An esterification catalyst or initiator may be added to the first stage esterification reaction in order to reduce further the duration of processing time of the polyester. Generally, the catalyst can be any tin, lead or lithium catalyst or initiator or any other catalyst or initiator known in the art to catalyze or initiate the reaction of isophthalic acid terephthalic acid and polyols. The reaction of the remaining portion of polyol with the agitatable mixture may be accomplished by adding the remaining portion continuously or incrementally. Also, the remaining portion of polyol may be heated and added to the heated agitatable mixture.

All the isophthalic or terephthalic acid need not be contacted initially with the first portion of the total amount of polyol. A substantial amount of the isophthalic or terephthalic acid should be contacted initially and the remaining amount of the isophthalic or terephthalic acid should be contacted before the remaining portion of the total amount of polyol is added to the heated agitatable mixture which already contains an amount of the half-ester.

The agitatable mixture is heated at ambient pressure to at least a temperature of 190° C. and maintained at least at this temperature while the remaining portion of polyol is added. However, the temperature can be as much above 190° C. as the esterification equipment will allow but the polyester resin produced may have undesired characteristics if the temperature is too high. Therefore, the temperature should not be above 230° C.

If a pressure other than ambient pressure is used the temperature should still be at least 190° C.

The term "polyester" describes the di-ester polymer product wherein both of the carboxylic acid groups of the diacid of isophthalic acid or terephthalic acid have reacted to form a polymer.

The term "half-ester mixture" describes the mixture obtained from the reaction between the isophthalic acid or terephthalic acid and the polyol. This mixture consists mainly of the mono-ester wherein only one of the carboxylic acid groups of the diacid of isophthalic acid or terephthalic acid have reacted with the polyol. The mixture may also contain a trace amount of diacid product between isophthalic or terephthalic acid and polyol, i.e., poly-di-ester, and other further reacted compounds.

The term "total amount of polyol" means an amount of polyol in a range from at least the theoretical amount, which is one equivalent of polyol for each equivalent of acid to produce the polyester, up to an amount usually not more than 125 percent of the theoretical amount. More of an excess may be used but it would lessen the effectiveness of the process.

The term "agitatable mixture" means a mixture between substantially all of the isophthalic acid or terephthalic acid and the first portion of polyol which is in an amount to allow mixing in conventional mixing equipment used in the production of polyesters from isophthalic or terephthalic acid. The agitatable mixture of isophthalic or terephthalic acid and first portion of the total amount of polyol must be mixed in order to provide even temperatures throughout the mixture.

The term "acid" as used in the discussion of the process of this invention and in the appended claims includes the corresponding anhydrides where such anhydrides exist.

DETAILED DESCRIPTION OF THE INVENTION

Throughout the remaining discussion of the process of this invention the term "isophthalic acid" shall include the term "terephthalic acid" unless otherwise expressly stated.

A problem in reducing the processing time in a two-stage process for the production of a polyester from isophthalic acid, at least a theoretical amount of polyol, and a saturated or unsaturated aliphatic polycarboxylic acid or anhydride is the first stage reaction rate. This esterification reaction rate is very slow until an adequate temperature is obtained. Broadly, a temperature of at least 190° C. but preferably 195° C. is the temperature around which the reaction should be conducted. The desired reaction temperature in the range of 190°-230° C. and preferably in the range of 195°-210° C. appears to be limited by the boiling point of the reaction mixture when all of the total amount of polyol is contacted at once with all of the isophthalic acid. A reaction mixture of a portion of the total amount of polyol and isophthalic acid achieves the desired reaction temperature more quickly.

The total amount of polyol is commonly in the range of about 105 to 110 percent of the theoretical amount needed. The first portion of the total amount of polyol is at least an amount that makes a substantial amount of the isophthalic acid mixable or agitatable with the liquid polyol. The amount of polyol in the first portion should not exceed an amount slightly less than the theoretical amount of polyol needed to react with the isophthalic acid and saturated or unsaturated aliphatic polycarboxylic acid to form the polyester. The closer the first portion comes to this theoretical amount, the smaller the amount of reduction in processing time. The amount of polyol in the first portion of polyol is in the range of 0.5 to 1.7 moles per mole of isophthalic acid and preferably in the range of 0.8-1.4 moles per mole of isophthalic acid. Also a solvent can be used to make the isophthalic acid more soluble in the polyol. If a solvent is used, it is preferably a non-reactive solvent which forms an azeotrope with water. Typical of such a solvent is xylene.

The amount of isophthalic acid with which the first portion of polyol is contacted need not be all the isophthalic acid that is going to be reacted. The amount of isophthalic acid need be only a substantial amount of the total amount of isophthalic acid to be reacted. This substantial amount is that amount which will form an agitatable mixture of isophthalic acid and polyol with the use of amounts of polyol that are less [that] *than* the theoretical amount. This amount is in the range of 50 to 90 percent by weight of the total amount of isophthalic acid to be used, which depends on the formulation for the particular polyester desired.

The agitatable mixture of isophthalic acid and *the* first portion of polyol is heated while being agitated to a temperature which is at least a temperature of 190° C. and is preferably in the range of 195°-210° C. While the agitatable reaction mixture is at this temperature, the remaining portion of the total amount of polyol is added to the mixture in such a manner as not to reduce the temperature below the temperature of 190° C. and preferably 195° C. This manner may be performed by adding the remaining portion of polyol at such a rate that the temperature is not decreased. The rate of addition may be accelerated by heating the remaining portion of polyol before it is added to the heated agitatable mixture to a temperature above ambient temperature but below the boiling temperature of the polyol. This agitatable reaction mixture containing the total amount of polyol continues to react to produce a half-ester mixture. The esterification reaction was taking place since the first portion of polyol was contacted with isophthalic acid and the resulting agitatable mixture was heated to the adequate reaction temperature of at least 190° C. The esterification reaction continues until the reaction is complete as indicated by the acid number of the half-ester mixture. If the final desired acid number of the half-ester mixture is reached before all of the remaining portion of polyol is added, the excess polyol that is left may be used as a coolant. The coolant would aid in cooling the half-ester mixture before the addition of aliphatic polycarboxylic acid. The half-ester mixture produced is composed of isophthalic acid and polyol and has an acid number of less than 90 milligrams of potassium hydroxide to neutralize 1 gram of the half-ester mixture.

This half-ester mixture is reacted with an aliphatic polycarboxylic acid in the second stage. The aliphatic polycarboxylic acid may be saturated or unsaturated but is preferably unsaturated. This second stage is conducted in any manner known to those skilled in the art of two-stage polyester production processes. The product from the second stage is the polyester having a desired acid number.

The polyester produced by the improved process of this invention can be prepared from those polyols or a mixture of those polyols utilized in conventional processes. These polyols include: ethylene glycol, propylene glycol, butylene glycol, diethylene glycol, dipropylene glycol, triethylene glycol, neopentyl glycol, trimethylene glycol, polyethylene glycol, polypropylene glycol, 1,6-hexanediol, 1,5-pentanediol, trimethylolethane, trimethylolpropane, glycerol, 1,2,6-hexanetriol, pentaerythritol, sorbitol, mannitol, methyl glycoside, and the like. Other polyols including unsaturated polyols may be used alone or in addition to the above mentioned polyols. This list of polyols is exemplary of the polyol that may be used, and the list is not exhaustive. Typically, the total amount of polyol up to 125% of theoretical is used but even greater excesses may be utilized if desired.

The aliphatic polycarboxylic acid used in the production of the polyester by the improved process of this invention may be any of the polycarboxylic acids conventionally used. Examples of such polycarboxylic acids include: maleic acid, fumaric acid, itaconic acid, citraconic acid, glutaconic acid, mesaconic acid. Other polycarboxylic acids including saturated polycarboxylic acids may be used in addition to the above-mentioned acids.

The polyester may be produced by the process of this invention with even a greater reduction in processing time when an esterification catalyst or mixture of esterification catalyst is used in the first stage. Catalysts known by those skilled in the art to be effective in the esterification reaction of the first stage include inorganic salts and organic compounds of tin, lead or lithium. Examples of inorganic tin salts include: stannous salts, such as stannous halides, like stannous bromide, stannous chloride, stannous fluoride, stannous iodide, stannous oxychloride; and other stannous salts, like stannous hydroxide, stannous sulfate, stannous oxide, stannous acetate; and stannic salts, such as stannic chloride, stannic bromide, stannic fluoride, and stannic oxychloride; and stannous acylates; and stannous alkoxides. Examples of organic tin compounds include dialkyltin salts of carboxylic acid, like dibutyltin diacetate, dibutyltin dilurate and dibutyltin maleate; and dialkyltin chlorides, like dibutyltin chloride; and dialkyltin oxides, like dibutyltin oxide, and dilaryltin oxide; and trialkyltin hydroxides, like tributyltin hydroxide and trimethyltin hydroxide. These catalysts are effective in amounts of about 0.01 percent by weight to about 2.0 percent by weight of the total weight of the charge in the first stage. Higher quantities of catalysts can be used if desired. Other catalysts known to those skilled in the art that may be used in the improved process of this invention are tetrabutyl zirconium and zirconium naphthonate.

In the preferred embodiment of the process of this invention isophthalic acid and not terephthalic acid is used as the aromatic polycarboxylic acid to be esterified. Propylene glycol is the preferred polyol used in the improved process of this invention. The total amount of propylene glycol is a theoretical amount of around 2 moles of propylene glycol per mole of isophthalic acid and maleic acid. The preferred catalyst is dibutyltin oxide in an amount of around 0.2 percent by weight of total weight charged to the first stage. The production of the polyester is conducted in the presence of an inert gas at atmospheric pressure.

All of the isophthalic acid is added to a suitable reaction vessel for carrying out condensation reactions. This vessel may be constructed of stainless steel or it may be a glass-lined kettle which is insulated to prevent heat loss. The vessel should be equipped with an agitator, heating and cooling coils, a temperature measuring device, vapor removal equipment for continuous removal of water of esterification, and may include vapor columns designed to minimize loss of low boiling polyols. The vessel also contains an inert gas inlet for conducting the reaction in an inert atmosphere of nitrogen. The first portion of total amount of propylene glycol is added to this vessel which contains all the isophthalic acid to be reacted. The amount of propylene glycol in this first portion is in the range of 0.8–1.4 moles per mole of isophthalic acid but most preferably in the range of 0.9–1.0 mole per mole of isophthalic acid. The resulting mixture is quite thick but it can be agitated and it becomes more fluid when the temperature is increased.

This resulting agitatable mixture of isophthalic acid and first portion of propylene glycol is agitated and heated to a temperature of at least 190° C. and preferably in the range of 195° C.–210° C. at ambient pressure. This temperature is quickly and easily obtained. When the temperature reaches about 198° C., the remaining portion of the total amount of propylene glycol is added to the mixture of isophthalic acid and first portion of propylene glycol. This addition is at the fastest practical rate while maintaining a minimum temperature of at least 190° C. and preferably 195° C. Upon completion of the addition of the remaining portion of propylene glycol, the first stage reaction is continued to completion which is indicated by the acid number of the product. The product of the first stage is a half-ester mixture of isophthalic acid and propylene glycol which has an acid number of less than 90 milligrams and preferably in the range of 20–90 milligrams of potassium hydroxide to neutralize 1 gram of half-ester mixture.

The vessel containing the half-ester mixture is cooled to around 150° C. and maleic anhydride is added. The maleic anhydride is the preferred aliphatic polycarboxylic acid. The vessel is heated to a temperature of around 200° C. and held at this temperature for the duration of the polyesterification reaction. The duration depends on the desired acid number in the final product. After the desired acid number is obtained, the reactor is cooled. The product from the second stage is the unsaturated polyester.

The unsaturated polyesters produced by the improved process of this invention can be thinned in a suitable reactive monomer in a manner known to those skilled in the art.

For a better understanding of the invention reference should be had to the following examples. In the following examples the term isophthalic acid does not include the term terephthalic acid.

ILLUSTRATIVE EXAMPLE NO. 1

For the purposes of comparison unsaturated polyester was prepared from isophthalic acid, propylene glycol and maleic anhydride according to a conventional two-stage process. All of the propylene glycol, which was a theoretical amount of the two moles of propylene glycol to one mole of isophthalic acid considering the one mole of maleic anhydride to be added to form the polyester, was added to the isophthalic acid. A weight percent amount of 36.5% of propylene glycol was added to 39.9 wt. % of isophthalic acid, based on a total weight of the components, for the final unsaturated polyester. This mixture was heated to the adequate reaction temperature of 200° C. and held until the acid number of the half-ester mixture produced decreased to 25–30 milligrams. The mixture was cooled and 23.6 wt. % of maleic anhydride was added to produce the unsaturated polyester. The yield was 96.7% of the theoretical yield. The first stage processing time was 11¼ hours.

EXAMPLE NO. 2

A first portion of 7,310 kg of propylene glycol was added to 11,402 kg of isophthalic acid. This gave a mixture having a 1.4/1.0 moler ratio of propylene glycol to isophthalic acid. This mixture was agitated and heated to 198° C. The remaining portion of propylene glycol, 3,132 kg equivalent to 0.6 moles per mole of isophthalic acid, was added to the heated agitatable mixture in 2¾ hours, thus, holding the reaction temperature at 198° C. The reaction was continued until the half-ester mixture had an acid number of 25 to 30 milligrams at 200° C. without the use of a catalyst. The half-ester mixture which contained the esterification product of propylene glycol and isophthalic acid was cooled. Then maleic anhydride in an amount of 6,732 kg was added. This combination of half-ester mixture and maleic anhydride was heated to a temperature of around 200° C. This temperature is maintained until the desired acid number of the unsaturated polyester was achieved. Then the temperature was decreased and the product, an unsaturated polyester resin, was removed. The first stage processing time was 7½ hours. This is a processing time savings of 40% compared to the conventional process in Illustrative Example No. 1.

EXAMPLE NO. 3

A first portion of propylene glycol equaling 4,614 kg was added to 7,279 kg of isophthalic acid. The resulting mixture had a moler ratio of 1.4/1.0 propylene glycol to isophthalic acid. An amount of dibutyl tin oxide of 57 kg or 0.2 wt. %, based on the total weight of components in the charge to the first stage, was added to the mixture. The mixture was agitated and heated to 185° C. at which temperature the mixture became more fluid. An additional amount of 3,919 kg of isophthalic acid was added to the mixture. This addition brought the moler ratio of propylene glycol to isophthalic acid to 0.9/1.0 in the mixture. The mixture was agitated and heated to 198° C. and the balance of the propylene glycol, 6,152 kg (1.20 moles/mole of isophthalic acid), was added in 2-¾ hours thus maintaining the reaction temperature at 198° C. This addition of the balance of the propylene glycol was at such a rate that the temperature of the reaction did not decrease below 198° C. This addition consisted of dribbling the remaining portion of the propylene glycol into the heated, agitated mixture from a weigh tank.

After the addition of all of the balance of propylene glycol the mixture was held at 200° C. until the acid number decreased to 25 to 30 milligrams and the half-ester mixture was cooled to a temperature of around 150° C. Maleic anhydride in an amount of 6,732 kg was added and the combination of half-ester mixture and maleic anhydride was heated to a temperature of around 200° C. The temperature is held until the desired acid number product is obtained. Then the reactor vessel was cooled and the unsaturated polyester removed. The first stage processing time was 7½ hours.

Table I summarizes the first stage processing time results of several runs conducted by the two-step glycol addition of the improved process of this invention and a conventional two-stage process. The conventional two-stage process runs are for the purpose of comparison. The conventional runs were conducted in a similar manner as Illustrative Example No. 1 and a few of the conventional runs were performed with a dibutyl tin oxide catalyst. The runs according to the improved process of this invention were conducted in a manner similar to Example No. 2 with and without the use of a catalyst. The results indicated that the improved process of this invention, even without the use of a catalyst, improves the processing time of a two-step process better than the use of a catalyst in a conventional two-step process.

TABLE I

Processing Time Comparison

| Run # | Process Used | % Wt. DBTO* | Processing Time 1st Stage, Hrs. |
|---|---|---|---|
| 1 | Conventional | None | 12 |
| 2 | Conventional | None | 11 |
| 3 | Conventional | None | 9 |
| 4 | Conventional | None | 9 |
| 5 | 2-Step Glycol Addition | None | 7½ |
| 6 | Conventional | 0.1 | 10 |
| 7 | 2-Step Glycol Addition | 0.1 | 6 |
| 8 | Conventional | 0.2 | 10 |
| 9 | 2-Step Glycol Addition | 0.2 | 4 |
| 10 | 2-Step Glycol Addition | 0.2 | 4 |

*Dibutyltin oxide

According to the provisions of the patent statutes, I have explained the principle, preferred construction and mode of operation of my invention and have illustrated and described what I now consider to represent its best embodiment. However, I desire to have it understood that within the scope of the appended claims, the invention may be practiced otherwise than as specifically illustrated and described.

I claim:

1. In a two-stage process for the production of polyesters wherein an aromatic polycarboxylic acid selected from the group consisting of isophthalic acid and terephthalic acid is reacted in the first stage with a polyol to produce half-ester mixture which is reacted with a saturated or unsaturated aliphatic polycarboxylic in the second stage to produce the polyester, to reduce the processing time in the first stage; thereby reducing the processing time for the production of the polyester, comprising:

a. contacting first portion of the polyol with the aromatic polycarboxylic acid in the first stage in an amount at least sufficient to form an agitatable mixture with the aromatic polycarboxylic acid but in an amount slightly less than the theoretical amount of polyol needed to react with the isophthalic acid or terephthalic acid and saturated or unsaturated aliphatic polycarboxylic acid, b. heating the agitatable mixture *with agitation* to a temperature of at least 190° C. to 230° C., and c. adding the remaining portion of the polyol to the heated agitatable mixture *with agitation* in the first stage in such a manner that the temperature of the heated agitatable mixture is maintained at a temperature of at least 190° C. in order to produce a half-ester mixture.

2. A process according to claim 1 wherein an esterification catalyst selected from the group consisting of inorganic salts and organic compounds of tin, lead or lithium and mixtures of said salts and compounds, and tetrabutyl zirconate, and zirconium naphthenate is used in the first stage during contacting of the first portion of polyol and aromatic polycarboxylic acid and heating of the agitatable mixture and adding the remaining portion of polyol to the heated agitatable mixture.

3. A process according to claim 2 wherein the catalyst is dibutyl tin oxide present in an amount of 0.01 to 2.0 percent by weight of the total weight of the charge in the first stage.

4. A process according to claim 1 wherein the unsaturated polycarboxylic acid is selected from the group of acids and anhydrides consisting of maleic acid or anhydride, fumaric acid or anhydride, itaconic acid or anhydride, citraconic acid or anhydride, glutaconic acid or anhydride, and mesaconic acid or anhydride.

5. A process according to claim 1 wherein the polyol is selected from the group consisting of ethylene glycol, propylene glycol, butylene glycol, diethylene glycol, dipropylene glycol, triethylene glycol, neopentyl glycol, trimethylene glycol, polyethylene glycol and polypropylene glycol.

6. A process according to claim 1 wherein the amount of polyol present in the first portion of polyol is in the range of 0.5 to 1.7 moles of polyol per mole of aromatic polycarboxylic acid.

7. A process according to claim 1 wherein the remaining portion of polyol is heated to a temperature in the range from ambient temperature to a temperature less than the boiling point of the polyol before the remaining portion is added to the heated agitatable mixture in order to add the remaining portion of polyol while maintaining the temperature of the heated agitatable mixture at a temperature of at least 190° C.

8. A process according to claim 1 wherein the first portion of polyol is contacted with a first portion of the aromatic polycarboxylic acid present in a substantial amount and the remaining portion of the aromatic polycarboxylic acid is added after the mixture of the first portions of polyol and aromatic polycarboxylic acid is heated. 1

9. A process according to claim 1 wherein the amount of polyol present in the first portion of polyol is in the range of 0.8 to 1.4 moles of polyol per mole of aromatic polycarboxylic acid.

* * * * *